(12) United States Patent
Lowder et al.

(10) Patent No.: US 9,541,679 B1
(45) Date of Patent: Jan. 10, 2017

(54) INTEGRATING VOLUME FOR LASER LIGHT HOMOGENIZATION

(71) Applicant: nLIGHT Photonics Corporation, Vancouver, WA (US)

(72) Inventors: Tyson L. Lowder, Vancouver, WA (US); Joe Kollmann, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 237 days.

(21) Appl. No.: 13/795,195

(22) Filed: Mar. 12, 2013

(51) Int. Cl.
*G02B 5/02* (2006.01)

(52) U.S. Cl.
CPC ............ *G02B 5/021* (2013.01); *G02B 5/0236* (2013.01); *G02B 5/0284* (2013.01); *G02B 5/0215* (2013.01)

(58) Field of Classification Search
CPC ..... G02B 5/021; G02B 5/0215; G02B 5/0236; G02B 5/0284; G01J 2001/0481
USPC . 359/599, 626; 356/215–216, 236; 250/228, 205
See application file for complete search history.

(56) References Cited

U.S. PATENT DOCUMENTS

| | | | | |
|---|---|---|---|---|
| 4,868,383 A | * | 9/1989 | Kurtz | G03B 27/542 250/228 |
| 5,010,246 A | * | 4/1991 | Tsuyuguchi et al. | 250/216 |
| 6,437,861 B1 | * | 8/2002 | Kuta | 356/236 |
| 6,846,085 B2 | | 1/2005 | Minneman et al. | |
| 7,845,825 B2 | * | 12/2010 | Ramer et al. | 362/231 |
| 2011/0230037 A1 | * | 9/2011 | Tanaka et al. | 438/487 |
| 2012/0242987 A1 | * | 9/2012 | Liu et al. | 356/301 |

\* cited by examiner

*Primary Examiner* — Pascal M Bui Pho
*Assistant Examiner* — Marin Pichler
(74) *Attorney, Agent, or Firm* — Klarquist Sparkman, LLP

(57) ABSTRACT

An integrating volume for laser light homogenization includes a housing having an interior surface defining a light integrating cavity of a non-spherical configuration in the housing interior, an input port on the housing to allow entry of light from a laser beam through the input port into the light integrating cavity, and an output port on the housing and offset from the input port to allow sampling of light from the light integrating cavity through the output port after the light has reflected in the light integrating cavity between different portions of the interior surface of the housing so as to homogenize the light for sampling at the output port.

19 Claims, 4 Drawing Sheets

INTEGRATING VOLUME FOR LASER LIGHT HOMOGENIZATION

BACKGROUND OF THE INVENTION

1. Field of the Invention

Generally, the field of the present invention is monitoring the power of light emitted by a laser. More particularly, the present invention relates to an integrating volume for homogenizing a sample of the laser light before the monitoring occurs.

2. Background Art

In many laser-based systems it is desirable to internally monitor the output power of the laser by sampling a small portion of the laser light with a monitor photodiode (MPD). The electrical signal output from the MPD may be used to adjust either the current or voltage in a feedback system for controlling the operation of the laser. One challenge that is faced in being able to effectively monitor the output power of the laser beam is that the detected power is not uniform.

Another issue that often arises when using a MPD is the small signal level that is required to saturate the photodiode response. Most MPD saturate at peak power levels of a few mW, meaning that sufficient attenuation of the pick-off beam taken from the main beam needs to be provided.

To ensure that the MPD spatially samples the entire pick-off beam, it is desirable to homogenize the beam intensity profile. Beam homogenization can be achieved through several methods, such as an engineered diffuser or a classical integrating sphere. Integrating spheres are common optical components used for various lab and industry purposes. The inside of integrating spheres is often made with a highly reflective surface that produces almost perfect Lambertian scatter, meaning that the reflected light from any given surface reflects with equal intensity in all directions ($2\pi$ steradians).

While in theory integrating spheres can perfectly homogenize a given light source with little optical loss, many are expensive and can be rather large, although a miniaturized integrating sphere is disclosed in U.S. Pat. No. 6,846,085. Furthermore, often integrating spheres cannot handle high peak power applications like those found in diode pumped solid state laser systems or fiber laser systems. Consequently, there remains a need for an innovation that avoids the drawbacks of the integrating sphere.

SUMMARY OF THE INVENTION

The present invention is directed to an innovation that avoids the aforementioned drawbacks by providing a relatively simple, low cost, and compact integrating volume that has a light integrating cavity non-spherical in shape and defined by a semi-diffuse surface configured to sufficiently homogenize the intensity profile of a pick-off beam before detection by an MPD. In addition, the cavity of the integrating volume can be tailored, and provides means, to attenuate the pick-off beam such that the MPD does not experience saturation.

Accordingly, one aspect of the present invention is an integrating volume for laser light homogenization that includes a housing having an interior surface defining a light integrating cavity of a non-spherical configuration in the housing interior, an input port on the housing to allow entry of light from a laser beam through the input port into the light integrating cavity, and an output port on the housing and offset from the input port to allow sampling of light from the light integrating cavity through the output port after the light has reflected in the light integrating cavity between different portions of the interior surface of the housing so as to homogenize the light for sampling at the output port.

Another aspect of the present invention is that the interior surface of the housing defining the light integrating cavity has first and second pairs of surface portions. The surface portions of the first pair have curved shapes. The surface portions of the second pair have planar shapes. The curved surface portions of the first pair are spaced apart from one another and face toward one another. The planar surface portions of the second pair are spaced apart from one another, face toward one another and extend between and merge into the curved surface portions of the first pair so as to define a top, a bottom and opposite ends of the light integrating cavity. The cavity also has a third pair of surface portions spaced apart from one another at, and face toward one another from, opposite sides of the first pair of curved surface portions and the second pair of planar surface portions so as to define opposite sides of the light integrating cavity. One of the surface portions of the third pair has a curved shape and defines a rear side of the light integrating cavity. The other of the surface portions of the third pair has a planar shape and defines a front side of the light integrating cavity. The interior surface of the cavity also includes curved corner surface portions formed between the one curved surface portion of the third pair and the curved surface portions of the first pair.

Still another aspect of the present invention is that the interior surface has a roughness adapted to cause a semi-diffuse scattering of the light within the light integrating cavity so as to homogenize the light for sampling at the output port.

The foregoing and other objects, features, and advantages will become more apparent from the following detailed description, which proceeds with reference to the accompanying figures.

DETAILED DESCRIPTION OF THE INVENTION

Figure 1:
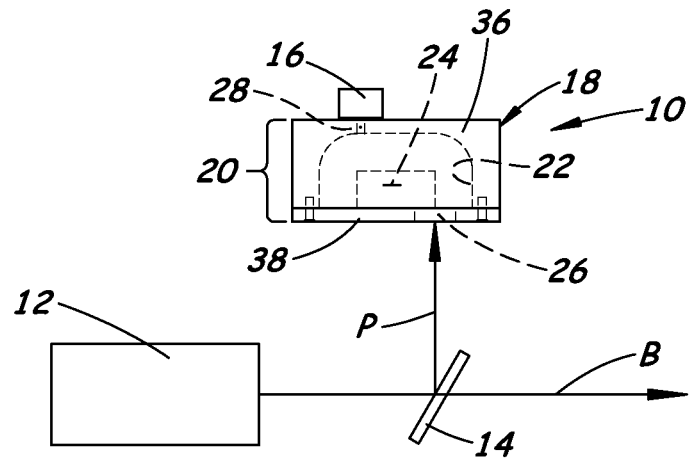
FIG. 1 is a schematic representation of an exemplary embodiment of a system for monitoring the output power of light emitted by a laser.
Figure 2:
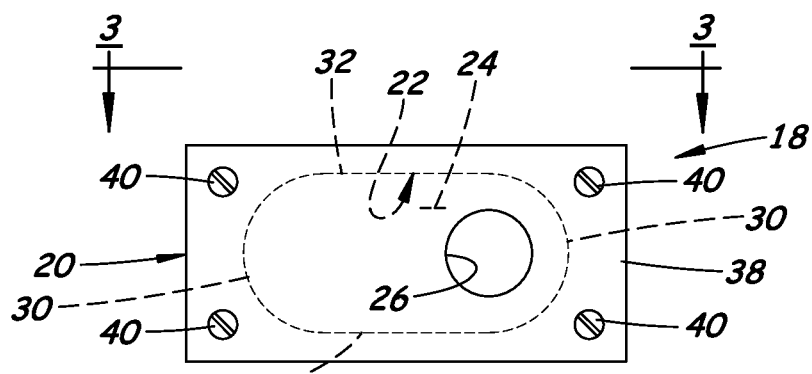
FIG. 2 is a front view of an exemplary embodiment of an integrating volume in the form of a housing employed by the system of FIG. 1 to homogenize a sample of the laser light in accordance with the present invention before monitoring occurs.
Figure 3:
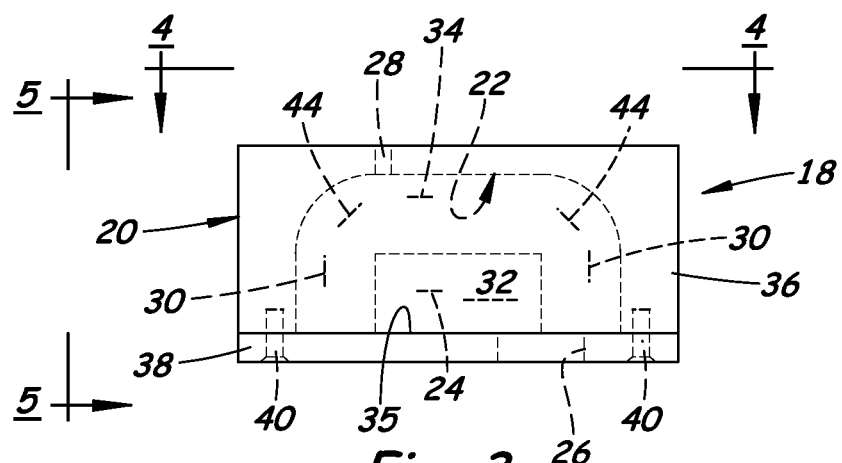
FIG. 3 is a top view of the integrating volume as seen along line 3-3 of FIG. 2 showing a lid covering an open front end of a body of the housing.
Figure 4:
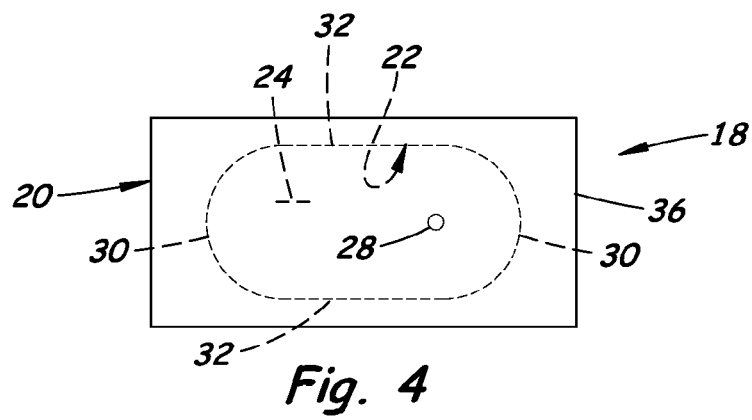
FIG. 4 is a rear view of the integrating volume as seen along line 4-4 of FIG. 3.
Figure 5:
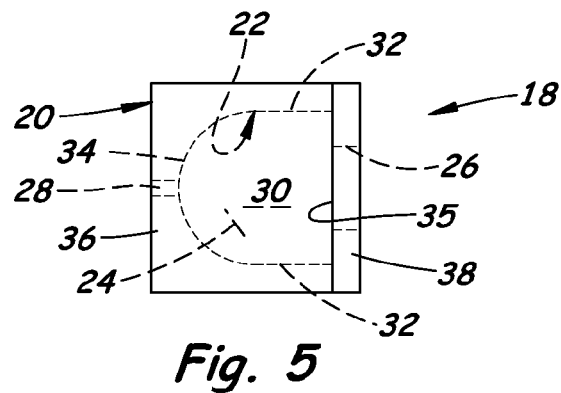
FIG. 5 is an end view of the integrating volume as seen along line 5-5 of FIG. 3.

Referring now to FIG. 1, there is shown, in a schematic form, an exemplary embodiment of a portion of a laser-based system, generally designated 10, in which a main beam B of light is emitted by a laser 12 for use in any one of many applications. In order to monitor the output power of the main beam B of light produced by the laser 12, the system 10 employs a pick-off optic 14 to divert a small fraction of the light taken from across the main beam into a lateral path to form of a pick-off beam P leading away from the main beam and toward a monitor photodiode (MPD) 16. The MPD 16 will sample the pick-off beam P and generate a signal to use, for example, as a feedback control to adjust the laser-based system 10.

However, as recognized by the inventor herein, the problem that is faced in being able to effectively monitor the output power of the laser beam is that the detected power is not uniform, meaning, in a graphical sense, that the power across one or more transverse axes of the main beam does not have a flat top profile. Thus, if only a small portion of a pick-off beam taken from the main beam, is incident on the MPD, wander of the pick-off beam could change the perceived incident power of the main beam as the MPD spatially samples different areas of the pick-off beam. So depending upon what part of the non-uniform pick-off beam is detected by the MPD, the system might wrongly interpret this lack of uniformity as a change in the laser power when in actuality the MPD is just looking at different parts of the pick-off beam. This perceived change in output power thus gives false information to the user or feedback system about the actual output power from the laser.

To ensure that the power of the sample of the pick-off beam P detected or looked at by MPD 16 at any one moment is the same at different parts of the beam P an integrating volume 18, in accordance with the present invention, is incorporated between the pick-off optic 14 and the MPD 16 to intercept and sufficiently homogenize the pick-off beam of laser light before it reaches and is monitored by the MPD 16.

Figure 6:
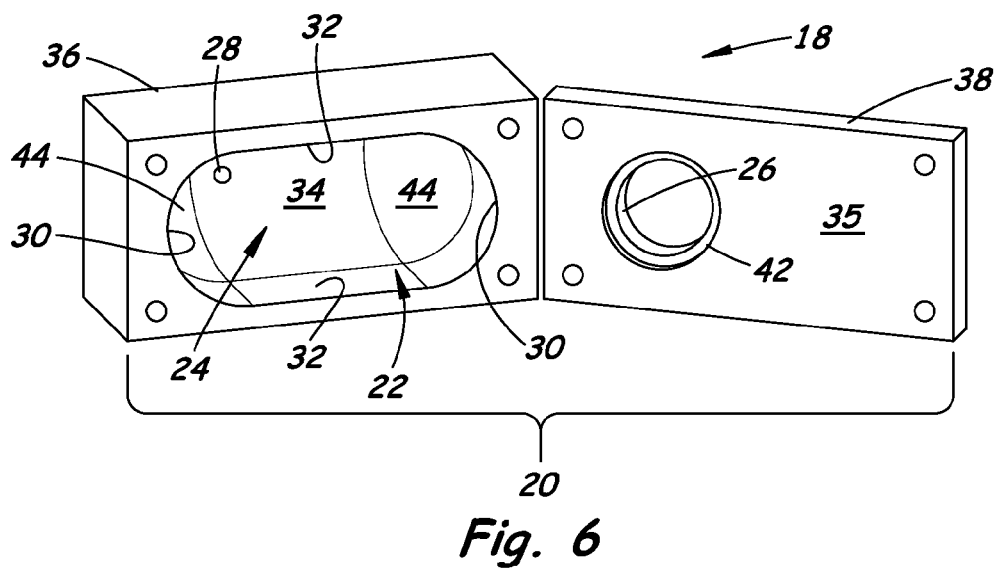
FIG. 6 is a perspective view of the integrating volume showing the lid removed from the body of the housing exposing a light integrating cavity in the interior of the housing.

Turning to FIGS. 2-6, an exemplary embodiment of the integrating volume 18 is shown. The integrating volume 18 includes a housing 20 of a generally rectangular shape on its exterior, although alternatively it may be other shapes. As best seen in FIG. 6, in accordance with the present invention, the housing 20 has an interior surface 22 defining a light integrating cavity 24 of a non-spherical configuration in the interior of the housing 20, and also input and output ports 26, 28 providing passages or openings respectively leading into and from the light integrating cavity 24. The input port 26 is provided on the housing 20 so as to allow entry of light from pick-off beam P, diverted from the main beam B, through the input port 26 into the light integrating cavity 24. The output port 28 is provided on the housing 20 and non-aligned with or offset from the input port 26 so as to allow sampling of light by the MPD 16 through the output port 28 from the light integrating cavity 24 after the light has reflected sufficiently in the light integrating cavity 24 between different portions of the interior surface 22 of the housing 20 so as to homogenize the light for its sampling at the output port 28.

Figure 7:
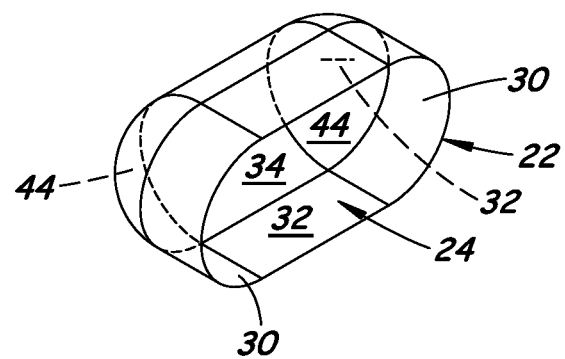
FIG. 7 is a perspective view of an interior surface defining the light integrating cavity in the body of the housing of FIG. 6, the interior surface being composed of curved and flat surface portions wherein the lines between them are for purposes of illustration only and are not actually present in the cavity.
Figure 8:
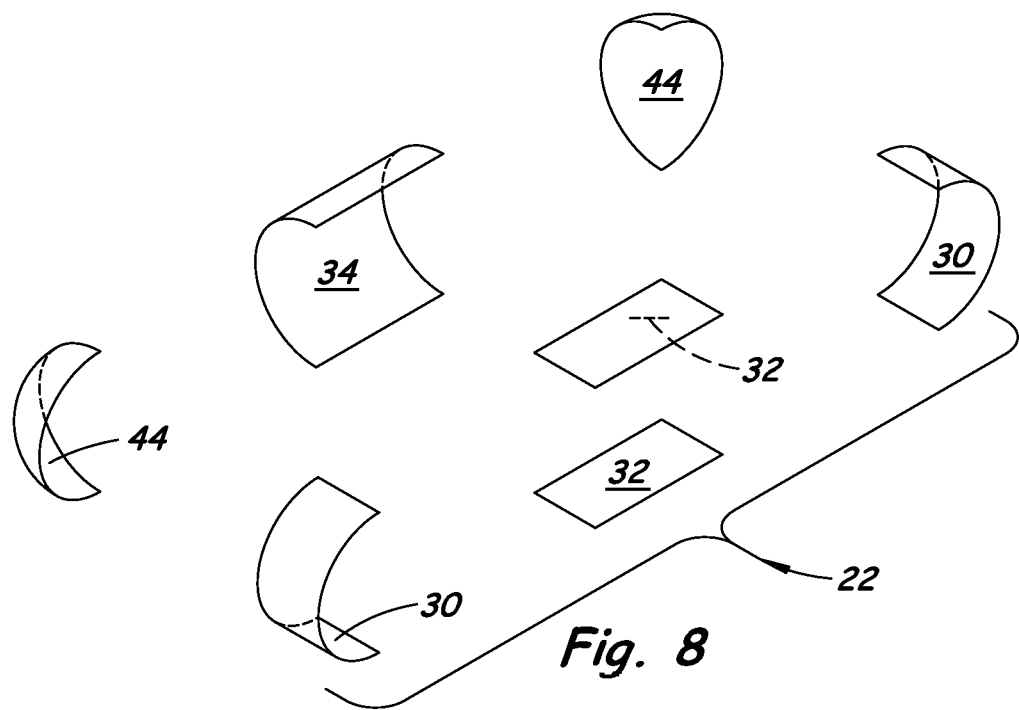
FIG. 8 is an exploded view of the curved and flat surface portions of interior surface of FIG. 7.

As seen in the exemplary embodiment of FIGS. 2-6, the interior surface 22 of the housing 20 has first and second pairs of surface portions 30, 32 and a third pair of surface portions 34, 35. The surface portions 30 of the first pair have curved shapes. The surface portions 32 of the second pair have planar shapes. The curved surface portions 30 of the first pair are spaced apart from one another and face toward one another. The planar surface portions 32 of the second pair are spaced apart from one another, face toward one another and extend between and merge into the curved surface portions 30 of the first pair so as to define a top, a bottom and opposite ends of the light integrating cavity 24, as seen in FIGS. 7 and 8. The third pair of surface portions 34, 35 are spaced apart from one another at, and face toward one another from, opposite sides of the first pair of curved surface portions 30 and the second pair of planar surface portions 32 so as to define opposite sides of the light integrating cavity 24. As also seen in FIGS. 7 and 8, the one surface portion 34 of the third pair has a curved shape and defines a rear side of the light integrating cavity 24, and curved corner surface portions 44 respectively merge with the curved surface portions 30 and the one surface portion 34 to define the curved corners of the light integrating cavity 24. The curved shape of the surface portion 34 defining the rear side of the cavity 24 is similar in configuration to the curved shapes of the surface portions 30 defining the opposite ends. The other surface portion 35 of the third pair has a planar shape and defines a front side of the light integrating cavity 24. While the planar surface portions 32 of the second pair, as shown, extend generally parallel to one another, relationships other than parallel may be employed. Furthermore, the overall shape of the light integrating cavity 24, as defined and bounded by the curved and planar surface portions of the interior surface 22 in FIG. 6, need not be exactly as shown.

Also seen in FIG. 6, in accordance with the present invention, the housing 20 includes a body 36 and a lid 38 adapted for securing together, such as by using conventional fasteners 40, to enclose the light integrating cavity 24. Both curved surface portions 30 of the first pair, both planar surface portions 32 of the second pair, the one curved surface portion 34 of the third pair, and both curved corner surface portions 44 are on the body 36. The other planar surface portion 35 of the third pair is on the lid 38. Additionally, the output port 28 is defined on the body 36 so as to open at the one curved surface portion 34 on the body 36, and the input port 36 is defined on the lid 38 so as to open at the other planar surface portion 35 on the lid 38. The input port 26 is larger in size than the output port 28. By way of example, but not of limitation, the input port 26 may be 2 mm in diameter, and the output port 28 may be 0.5 mm in diameter. Also, by way of example, but not of limitation, the envelope size of the integrating cavity 24 may be 0.5"×0.5"× 1.0".

Figure 9:
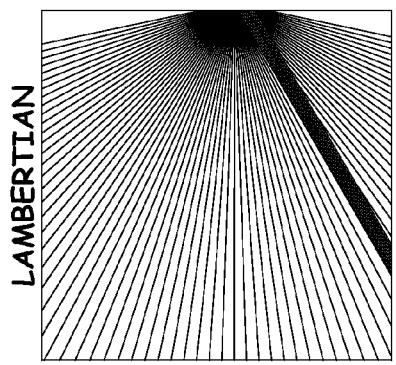
FIG. 9 is a simplified representation showing patterns of reflections of the same incident beam from respective specular and Lambertian surfaces compared with a pattern of reflections from a semi-diffuse surface as employed in the integrating volume in accordance with the present invention.
Figure 9:
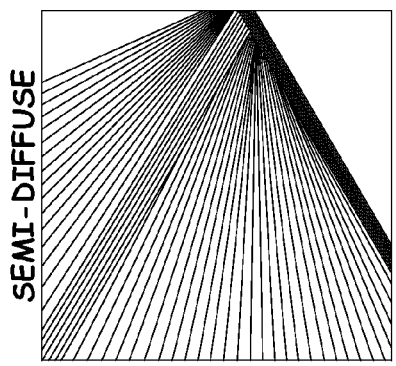
Figure 9:
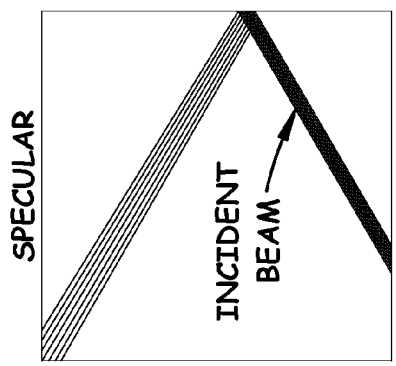

Also, in accordance with the present invention, the interior surface 22 is provided with a roughness adapted to cause a semi-diffuse scattering of the light within the light integrating cavity 24 so as to homogenize the light for sampling at the output port 28. FIG. 9 shows in a simplified representation the pattern of semi-diffuse reflections or scattering of light produced by the inexpensively provided interior surface 22 in the integrating volume 18 in comparison to reflection or scattering patterns of the same incident beam as would be produced by more expensively provided specular and Lambertian surfaces. The roughness of the interior surface 22 is provided by applying a treatment of at least one of chemical etching, or bead-blasting and anodizing, to the interior surface 22 in a manner known to one skilled in the art. The housing 20 of the integrating volume 18 is preferably made from a suitable metal such as standard aluminum that has its interior surface 22 bead blasted and finished with clear anodization. The bead blasting and anodization makes the interior surface 22 a sufficiently diffuse scatterer necessary to homogenize the light. An input port is provided on the lid to allow the light to enter the integrating cavity and one or more exit ports are provided for MPDs.

Further features on the integrating volume can be added to attenuate the incoming beam to levels that will not cause MPD saturation. For example, an input filter (not shown) may be placed over the input port 26 to uniformly attenuate all light entering the integrating cavity 24. A circular recess 42 may be formed about the input port 26 in the planar surface portion 35 on the lid 38 to accommodate the installation of the input filter. A filter could also be placed at the output port 28 to attenuate or filter out specific wavelengths. Additional output ports may also be provided in the integrating volume 18 where additional MPDs are to be employed. The aperture size of the input port 26 or output port 28 may also be changed to attenuate or increase the amount of light that enters the integrating cavity 24 or is incident on the MPD through the output port 28.

The integrating volume 16 is created using a ball end mill such that corners between the curved surface portion 34, at the rear side of the integrating cavity 24, and the curved surface portions 30, 32 at the opposite ends of the integrating cavity 24 are in the form of the curved corner surface portions 44. These curved corner surface portions 44 help to ensure that there are no edges present between the rear side and opposite ends of the cavity 24 so that incoming light is scattered into the cavity 24 after the first reflection and not immediately directed back out the input port 26 due to any specular components of the reflected light that might otherwise emanate from such edges.

Figure 10:
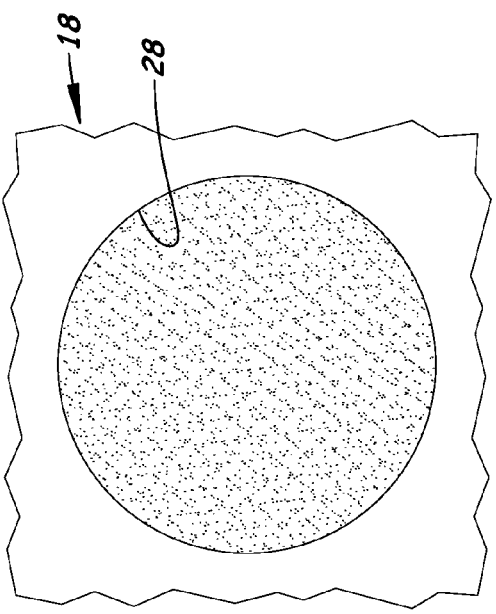
FIG. 10 is a simplified representation of an image of the homogenized light at an output port of the integrating volume.

Lastly, because the integrating volume 18 is made from standard aluminum, the component is very inexpensive and does not need to be manufactured using conventional machining, as opposed to high precision, techniques. The integrating volume 18 made of bead blasted and clear anodized aluminum creates a semi-diffuse integrating cavity 24. The semi-diffuse surface 22 sufficiently scatters the light such that after a few bounds or reflections inside the cavity 24 the light is adequately homogenized for receipt by the MPD 16. FIG. 10 is a simplified replica of the intensity of laser light that has been homogenized inside of the light integrating cavity 24. The use of aluminum also provides a component that is very resistant to potential damage from high intensity laser radiation. This obviates a problem recognized by the inventor herein with respect to the prior art integrating sphere, which is that a highly reflective surface often cannot withstand high intensity light, and damage from the first reflection is common if not carefully accounted for with attenuation outside of the integrating sphere.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:

1. An integrating volume for laser light homogenization, comprising:
    a housing having an interior surface defining a light integrating cavity of a non-spherical configuration in said housing interior;
    an input port on said housing to allow entry of light from a laser beam through said input port into said light integrating cavity; and
    an output port on said housing and offset from said input port to allow sampling of light from said light integrating cavity through said output port after the light has reflected in said light integrating cavity between different portions of said interior surface of said housing so as to homogenize the light for sampling at said output port;
    wherein said interior surface is partially specularly reflective, and wherein said interior surface further includes:
        a first pair of curved surface portions spaced apart from one another and facing toward one another, and
        a second pair of planar surface portions spaced apart from one another and facing toward one another, wherein said first pair of curved surface portions and said second pair of planar surface portions define a top, a bottom and opposite ends of said light integrating cavity; and
        a third pair of opposing surface portions spaced apart from one another and facing one another, and situated at opposite sides of said first pair of curved surface portions and said second pair of planar surface portions so as to define opposite sides of said light integrating cavity, wherein one of said surface portions of said third pair of opposing surface portions has a curved shape and the other of said surface portions of said third pair of opposing surface portions has a planar shape.

2. The integrating volume of claim 1, wherein said second pair of planar surface portions extend between and merge into said curved surface portions of said first pair so as to further define the top, bottom and the opposite ends of said light integrating cavity.

3. The integrating volume of claim 2, wherein said interior surface also includes curved corner surface portions formed between said one curved surface portion of said third pair of opposing surface portions and said curved surface portions of said first pair.

4. The integrating volume of claim 2, wherein said housing includes a body and a lid adapted for securing together to enclose said light integrating cavity.

5. The integrating volume of claim 4, wherein:
    said first pair of curved surface portions, said second pair of planar surface portions and one of said surface portions of said third pair of opposing surface portions are on said body; and
    the other of said surface portions of said third pair of opposing surface portions is on said lid.

6. The integrating volume of claim 5, wherein said input port is defined on said other of said surface portions of said third pair of opposing surface portions on said lid.

7. The integrating volume of claim 5, wherein said output port is defined on said one of said surface portions of said third pair of opposing surface portions on said body.

8. The integrating volume of claim 1, wherein said interior surface is made partially specularly reflective by treating said interior surface by at least one of chemical etching, anodizing and bead-blasting.

9. The integrating volume of claim 1, wherein said housing is made of aluminum.

10. The integrating volume of claim 1, wherein said input port is larger in size than said output port.

11. The integrating volume of claim 3, wherein said second pair of planar surface portions merge into said one curved surface portion of said third pair of opposing surface portions.

12. An integrating volume for laser light homogenization, comprising:
  a housing having an interior surface defining a light integrating cavity of a non-spherical configuration in said housing interior, said interior surface having:
    a first pair of curved surface portions spaced apart from one another and facing toward one another,
    a second pair of planar surface portions spaced apart from one another, facing toward one another and extending between and merging into said curved surface portions so as to define a top, a bottom and opposite ends of said light integrating cavity, and
    a third pair of opposing surface portions spaced apart from one another at, and facing toward one another from, opposite sides of said first pair of curved surface portions and said second pair of planar surface portions so as to define opposite sides of said light integrating cavity, wherein one of said surface portions of said third pair of opposing surface portions has a curved shape and the other of said opposing surface portions of said third pair of opposing surface portions has a planar shape;
  an input port on said housing to allow entry of light from a laser beam through said input port into said light integrating cavity; and
  an output port on said housing and offset from said input port to allow sampling of light from said light integrating cavity through said output port after the light has reflected in said light integrating cavity between said surface portions of said interior surface of said housing so as to homogenize the light for sampling at said output port.

13. The integrating volume of claim 12, wherein interior surface also includes curved corner surface portions formed between said one curved surface portion of said third pair of opposing surface portions and said curved surface portions of said first pair.

14. The integrating volume of claim 13, wherein said housing includes a body and a lid adapted to be secured together and enclose said light integrating cavity.

15. The integrating volume of claim 14, wherein:
  said first pair of curved surface portions, said second pair of planar surface portions, said one curved surface portion of said third pair of opposing surface portions and said curved corner surface portions are on said body; and
  the other planar surface portion of said third pair of opposing surface portions is on said lid.

16. The integrating volume of claim 15, wherein:
  said output port is defined on said one curved surface portion of said third pair of opposing surface portions on said body; and
  said input port is defined on said other planar surface portion of said third pair of opposing surface portions on said lid.

17. The integrating volume of claim 12, wherein said housing is made of aluminum.

18. The integrating volume of claim 12, wherein said interior surface is partially specularly reflective.

19. The integrating volume of claim 12, wherein said second pair of planar surface portions merge into said one curved surface portion of said third pair of opposing surface portions.

* * * * *